March 28, 1944. T. NAKAGAWA 2,345,143
AIRPLANE FLOAT CAPABLE OF BEING EXPANDED AND CONTRACTED
Filed Nov. 20, 1940
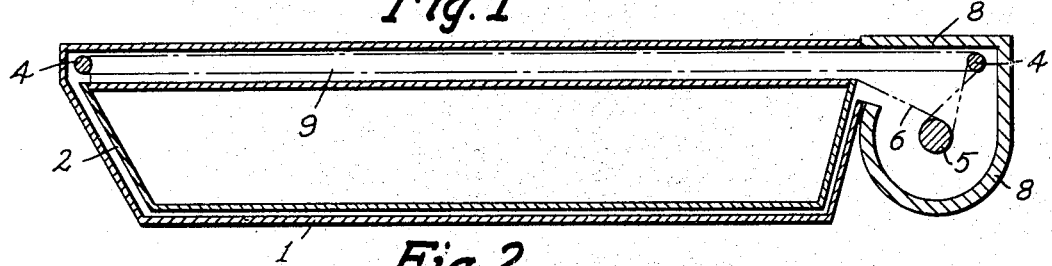
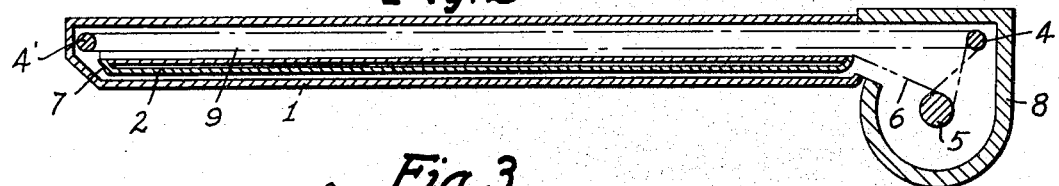
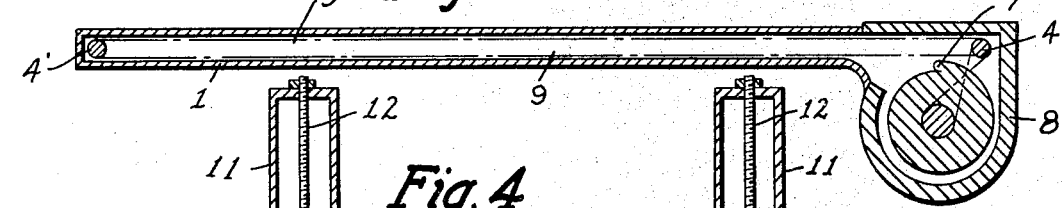
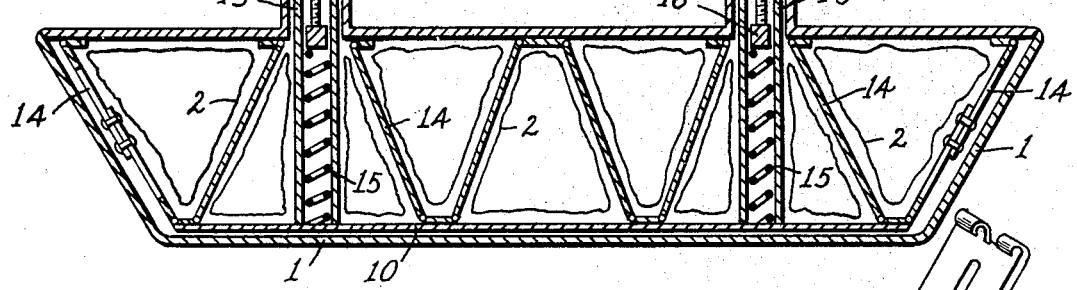
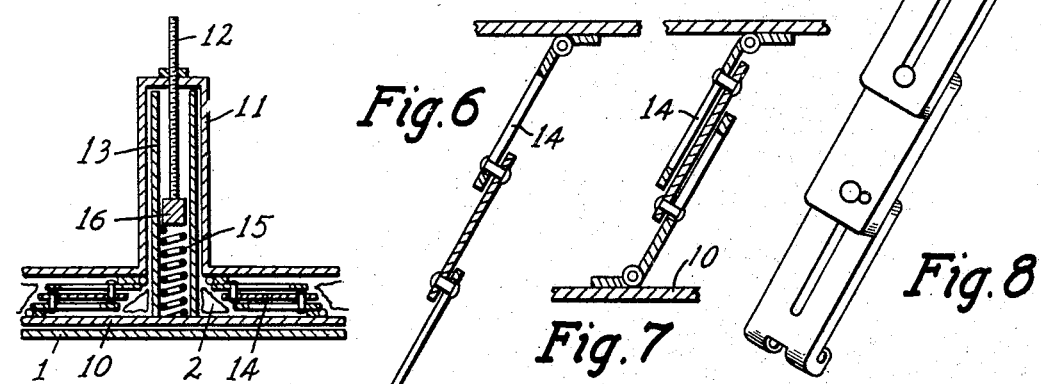
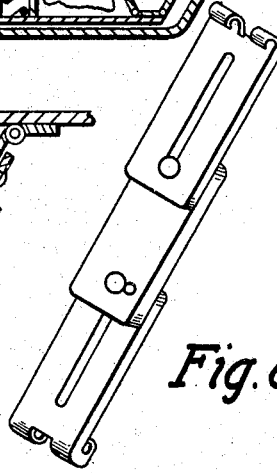
INVENTOR
Toyosaburo Nakagawa
ATTORNEY.

Patented Mar. 28, 1944

2,345,143

UNITED STATES PATENT OFFICE 2,345,143

AIRPLANE FLOAT CAPABLE OF BEING EXPANDED AND CONTRACTED

Toyosaburo Nakagawa, Shimonoseki, Yamaguchi-ken, Japan; vested in the Alien Property Custodian Application November 20, 1940, Serial No. 366,353
In Japan August 12, 1940

1 Claim. (Cl. 244—102)

This invention relates to improvement in airplane float of the type wherein the float itself is capable of being readily expanded or contracted as occasion demands and has for its object the provision of an airplane float of such type which is of relatively simple construction and can be, on flying, contracted in a flat state to decrease air resistance thereof but expanded, on alighting, to avoid the shock due to the collision with water surface and to prevent the constructions and instruments from being damaged.

Another object of the invention is to provide an airplane float capable of deforming, owing to the elasticity thereof in response to the variation in height of water surface to insure the stability of the airplane.

Further object of the invention is to provide an airplane float of such type which would not lose the function for a float even if a part thereof will be damaged.

For realization of the object set forth, the airplane float according to this invention is characterized by the combination of one or more envelopes capable of being evacuated and charged with air and outer elastic cover enclosing whole of the envelopes so that it may be evacuated to flat on the occasion of its non-use while on alighting it may be charged with air to expand in the form of a complete float.

The invention is more particularly described with reference to the accompanying drawing which shows, by way of example two forms of embodiment, in which Fig. 1 shows a longitudinal section of first embodiment according to the invention in position for use, Fig. 2 shows similarly a longitudinal section thereof in the state in which the envelope has been evacuated, Fig. 3 shows similarly a longitudinal section thereof in the state in which the envelope evacuated is held in a chamber, Fig. 4 shows a longitudinal section of a second embodiment according to the invention in position for use, Fig. 5 is a view similar to a portion of Fig. 4 with the float collapsed and showing a modified form of the inclined links, Fig. 6 shows a longitudinal section of one inclined link in its extended state, Fig. 7 shows a longitudinal section thereof in its contracted state, and, Fig. 8 shows a perspective view thereof.

Like letters indicate like parts throughout the drawing.

Referring to the first embodiment shown in Figs. 1-3, the airplane float consists of an outer elastic cover 1 made of any suitable material and fixed to the airplane at appropriate parts thereof, for instance, under side the body or wing and one or more envelopes 2 which is (or are) fully enclosed in the aforesaid cover. The cover 1 is attached to a chamber 8 which is made of, for instance, steel plate and arranged at a position adjacent the open end of the cover.

Of a pair of pulleys 4, 4', both being rotatably connected with each other through an endless belt 9, the pulley 4' is arranged inside the float at one end thereof opposite to the chamber 8, whilst the other pulley 4 is arranged inside the chamber 8 and connected rotatably through a cross belt with a rotating shaft 5 mounted inside the chamber 8. Said shaft 5 is driven by means of any suitable power transmission device (not shown in drawing). The envelope 2 is fixed, on the one hand, to the rotating shaft 5 through a string or the like 6, on the other hand fixed to the endless belt 9 at the position 7 thereof.

According to this embodiment, on the occasion of its non-use, for instance, on flying, the envelope 2 is exhausted by valve means not shown, and may be kept in the strong chamber 8 as shown in Fig. 3. In the case of the float being placed into use, for instance, on alighting, the envelope is at first, in accordance with the movement of the endless belt 9 driven by the shaft 5, pulled out of the chamber into the contracted cover 1 as shown in Fig. 2. Thereafter, the envelope is expanded together with the cover to the position shown in Fig. 1 by supplying air to the envelope through an air connection not shown from an air-charging means.

The envelope shown in Figs. 1-3 may be divided by partitions into several separate air chambers so that even if a part of the envelope should be damaged the residual air chambers may fully display the function as a float.

According to this invention it is possible to juxtapose a number of envelopes and to take up all of the envelopes on a common rotating shaft in a common chamber by means of an endless belt belonging to each envelope. Of course a large number of each separate floats such as those shown, can be provided at suitable positions on the airplane.

In the second embodiment shown in Figs. 4-8 the elastic cover 1 made of the material similar to that shown in Figs. 1-3 encloses the float which is carried by the hollow supports 11 fixed to the airplane at any appropriate part thereof. The bottom plate 10 of the float is carried by the hollow sliding supports 13 which may be guided upwardly and downwardly in the supports 11 through the screw bolts 12 engaged with the hollow support 11. The bottom plate is connected with the top plate of the float through a number of inclined links 14 each of which can be extended or shortened at will. Between the plates are placed a suitable number of envelopes 2. The float of this type is usually in expansion condition as shown in Fig. 4 due to the action of the spring 15 placed in the hollow sliding support 13.

According to this embodiment, when the floats are in use, for instance, on flying, the envelopes are at first evacuated through valves not shown and at the same time the screw bolts 12 are partly screwed out, whereby the sliding support 13 engaging with the head 16 of the bolt 12 is raised in the hollow support 11, consequently, the bottom plate 10 also may be raised towards the top plate against the action of the springs 15. This permits the elastic cover 1 to contract so that the float is collapsed to the position shown in Fig. 5. On the contrary in the case of the float being prepared, for instance, for alighting, through the reverse rotation of the screw bolt 12 and the air charging in the envelopes the float may be brought into expanded state as shown in Fig. 4.

It will be appreciated that the float according to the invention is, on flying, in its flat or collapsed state, so that air resistance acting on the float is diminished. If the floats are arranged on the underside of the wing, the flat float will have the same effect as that of the under side of the wing so that the resisting effect of the airplane will be increased. Owing to the elasticity of the cover, particularly in the embodiment shown in Figs. 4-8 owing to the elasticity of the inclined links, and the buffer action of the springs and the like, the airplane equipped with the float of the invention is subjected to minimum shock, even if it should collide with the water surface on alighting, so that the constructions and instruments of the airplane can be protected from the damage. As the float according to this invention may be varied in its shape in response to the variation in the height of water surface, an airplane equipped with this float has good stability. Even through the cover or one or more of the envelopes should be damaged the airplane is not subject to the risk of sinking because of the remaining undamaged envelopes.

Further, the float according to the invention has a light draft, so that the taking-off of the airplane is very easy. In the embodiment shown in Figs. 1-3 if the envelope should be divided by means of partitions into a number of separate chambers or if several envelopes are provided, the float will not lose its function even if some of the envelopes are damaged. In particular, in the first embodiment the envelope is held while flying in a rigid envelope chamber, so that the risk of damage of the envelope by shot and the like is diminished. In the second embodiment the bottom surface of the float can be made in wide area, so that the rolling and overturning of the airplane on alighting may be avoided.

It will be appreciated that the floats above described are merely two preferred embodiments according to the invention, but that many modifications may be effected without departing from the scope of the invention.

Having now particularly described and ascertained the nature of my said invention and in what manner the same is to be performed, I declare that what I claim is:

An airplane float capable of being expanded and contracted, said float comprising a reel chamber, a rotatable reel mounted in said chamber, an inflatable envelope of elastic material having one of its ends connected to said reel and being capable, in its deflated condition, of being wound upon said reel, an elastic casing of definite length and width and of variable depth, said casing being disposed with its ends parallel to the axis of said reel and communicating, at its rear end, with a slot in the wall of said reel chamber, a first pulley shaft disposed rotatably in said reel chamber opposite said slot with its axis extending parallel to that of the reel, means to drive said first pulley shaft from said reel for rotation in a direction opposite to that of the reel, a second pulley shaft rotatably mounted at the front end of said casing parallel to and in substantially the same plane as said first pulley shaft, and an endless belt carried on said pulley shaft, the free end of said envelope being secured to said endless belt to be guided by the latter when the envelope is wound upon or unwound from the reel.

TOYOSABURO NAKAGAWA.